United States Patent [19]

Blunt

[11] 4,133,923

[45] Jan. 9, 1979

[54] COATED BOTTLES

[75] Inventor: Harry W. Blunt, Hockessin, Del.

[73] Assignee: Hercules Incorporated, Wilmington, Del.

[21] Appl. No.: 845,511

[22] Filed: Oct. 26, 1977

Related U.S. Application Data

[63] Continuation-in-part of Ser. No. 711,340, Aug. 4, 1976, abandoned.

[51] Int. Cl.² ............................................. B65D 11/16
[52] U.S. Cl. .................................... 428/35; 215/12 R; 260/897 A; 428/441
[58] Field of Search ................. 428/35, 441, 516, 523; 260/897 A; 215/12 R, DIG. 6

[56] References Cited

U.S. PATENT DOCUMENTS

| | | | |
|---|---|---|---|
| 3,192,288 | 6/1965 | Sayko et al. | 260/897 A |
| 3,825,141 | 7/1974 | Campagna | 215/12 R |
| 3,825,142 | 7/1974 | Campagna | 215/12 R |
| 3,836,607 | 9/1974 | Finkmann et al. | 260/897 A |
| 3,900,534 | 8/1975 | Schard | 260/897 A |
| 3,924,767 | 12/1975 | Arrandale et al. | 215/12 R |
| 4,065,589 | 12/1977 | Lenard et al. | 215/12 R |

*Primary Examiner*—William R. Dixon, Jr.
*Attorney, Agent, or Firm*—William S. Alexander

[57] ABSTRACT

Coated bottles are disclosed having a coating comprised of an elastomeric blend of polypropylene with a hydrocarbon elastomer. The coating is adhered loosely to the bottle so that, upon rupture of the glass, it forms an envelope to contain glass fragments.

5 Claims, No Drawings

COATED BOTTLES

This application is a continuation-in-part of my co-pending application Ser. No. 711,340, filed Aug. 4, 1976 now abandoned.

This invention relates to the coating of glass bottles, in particular, to glass bottles which present a shattering hazard due to pressurized contents under their conditions of use.

Glass bottles, as is well known, are easily broken when dropped or otherwise subjected to rough handling. Under the best of conditions, breakage of glass is a hazardous occurrence — flying particles can cause injury to persons in the immediate vicinity, clean-up of the glass particles can result in cut hands for the person charged with performing the clean-up, and if the container happens to be filled at the time, the contents usually constitute another mess to be cleaned up.

When the glass container is filled, as is frequently the case, with a carbonated beverage, the pressure of the gas within the container multiplies the hazard associated with flying glass particles. Release of the gas pressure upon breakage can cause the glass particles to travel considerable distance at high speed, as projectiles, in effect. The result can be quite serious injury if such particles strike a person who happens to be in the vicinity of the accident.

The problems associated with glass breakage have received the attention of researchers in this art with varied results. Since it is obviously not feasible, for most applications, to make glass bottles heavy enough to resist breakage when dropped, the most natural approach is to coat the glass to prevent or minimize breakage.

The most widely used commercial coating is a foamed plastic shield applied to the side and part of the neck surfaces of the bottle but leaving the bottom uncovered. This coating appears to have its beneficial effect principally as a shock absorber during handling and shipping. When such a container is dropped, the uncovered bottom and neck portions allow an area from which quite a number of glass particles are still free to fly. Moreover, many consumers find these shields to be asethetically unappealing even though they are capable of being decorated in the product's conventional manner. One more objection to them is that, being foam, they are soft and accordingly easily marred and would also soften in hot water, so that reuse of bottles thus protected is not usually feasible.

Other coatings presently in commercial use are copolymers of ethylene and sodium acrylate or vinyl acetate. These materials form a thin, transparent film which is able to cover the entire surface, bottom, and neck of the bottle except for the threaded area on which a screw cap is intended to fit. The copolymer coating is only lightly adhered to the glass. When the glass is broken, whether from impact or from a spontaneous explosion, the coating pulls away from the glass and is not itself shattered. Remaining intact, the polymer film forms a bag wherein most of the glass particles and most of the contents of the bottle are restrained from flying about.

The ethylene copolymer coatings are highly effective for the intended purpose but possess several weaknesses which make them unsuited for use with reusable containers. The film is relatively soft and thus is easily marked, scratched, and otherwise defaced. But a more serious problem is that such films do not stand up to the hot alkaline environment encountered in cleaning bottles for reuse. This severely limits the number of times that such bottles can be reused.

It has been suggested that polyolefins, being quite tough and chemically inert, would be ideal materials for this application. Surprisingly, this was found not to be the case. Neither polypropylene nor polyethylene possesses the high rate tensile properties and energy absorption capability required to resist breakage when the glass breaks.

It is the purpose of this invention to provide elastomeric polyolefin compositions which have the required properties to function as coating materials for glass containers including those intended for use with carbonated beverages which are bottled under pressure. It is a further object to provide glass containers having a polyolefin coating which will inhibit particles of such a glass container from scattering when the glass is accidentally broken.

In accordance with this invention it has been found that glass bottles coated with an elastomeric alloy of polypropylene or an ethylene-propylene copolymer with about 15 to 40% by weight of a hydrocarbon elastomer possess the necessary properties whereby, when such bottles are broken by impact or by pressure rupture, glass fragments are prevented from scattering.

The polypropylene employed in the coatings of this invention can be any of the commercially available polypropylenes. These crystalline, film-forming polymers have intrinsic viscosities between about 1.9 and 3.7 dl/g. and a melting point of about 165°–175° C. The preferred polypropylenes are the medium viscosity products of about 2.2 to 3.0 intrinsic viscosity. However, many commercially available materials classified as polypropylene are actually copolymers of propylene and up to about 25%, preferably 5 to 10%, by weight of ethylene. The presence of the small ethylene component results in an increase in the elasticity and low temperature properties along with decreased crystallinity as compared to propylene homopolymer. The ethylene and propylene components can be arranged either in random or stereoregular (block) order. So long as the ethylene component is below 25%, the copolymer retains its thermoplastic, crystalline, film-forming character and is usable as the polypropylene component of the coatings contemplated by this invention.

The hydrocarbon elastomer most preferred for bottle coatings according to this invention is polyisobutylene rubber. A line of polyisobutylene rubbers is marketed under the trade name "Vistanex" by Exxon Chemical Company. These polymers are available both as low molecular weight materials which are soft and gummy and higher molecular weight materials which are more rubbery. The higher molecular weight materials are preferred for this application because of their rubbery characteristics.

Other hydrocarbon elastomers are also usable if they are at least partially compatible with the polypropylene component. For example, ethylene-propylene copolymer rubbers wherein the ethylene content is between about 40 and 60% are useful elastomers.

Also useful are the ethylene-proplyene terpolymers with, e.g., norbornadiene or 1,4-hexadiene, natural rubber, polyisoprene, polybutadiene and butadiene-styrene random or block copolymers, when they are unvulcanized.

Coatings of the polypropylene-elastomer blend can be applied by conventional coating techniques. Due to difficulties inherently encountered in reducing hydrocarbon polymers to the small particle size which is preferred for powder coating techniques, it is presently preferred to apply the coatings via a solution technique.

The polypropylene-elastomer blend coatings are applied from a relatively dilute solution in, preferably, a hydrocarbon liquid solvent at elevated temperatures. One or as many applications as desired can be made to a bottle, depending upon the thickness of coating required for the intended use of the container. Following the last application of elastomeric coating material, the container is subjected to a final bake at a temperature in excess of the melting point of the polymer to assure complete fusion of the polymers between and within the layers.

Both the propylene polymer and the elastomer are substantially plain hydrocarbon structures and as such are almost completely devoid of any polarity. For this reason the coating film does not adhere well to the glass. For the purposes of this invention, this limited adhesion is ideal since it permits the glass to break independently of the coating and to pull away from the coating on breakage. The coating thus remains substantially intact, forming a bag to restrain the fragments. The adherence, however, is usually strong enough to withstand the stresses applied as a result of the handling encountered in normal use.

As suggested hereinabove, the important parameters which must be met for a material to be satisfactory in the bottle coating application contemplated herein are good high rate elongation and good energy absorption characteristics at room temperature, both of which are typical elastomeric properties. In both of these parameters, the coating materials of the invention are excellent, i.e., at least equal to, but, more normally exceeding, those of the commercially used ethylene-sodium acrylate copolymer as shown in the following table.

vent at 150° C. The polypropylene-polyisobutylene ratio was 2:1 by weight. The bottles were preheated to 191° C., dipped seven times in the solution with solvent evaporation 3 minutes at 191° C. between dips and followed by a final bake 4 minutes at 205° C. and air cooled to 165° C., then quenched in cold water. The coating resulting from this procedure measured about 7 mils.

Bottles coated as described were dropped, empty, with no pressure, from a height of 7 feet onto a concrete floor. The bottle was shattered but the coating remained intact. All fragments were retained within the envelope formed by the coating, except for the uncoated threaded portion of the top.

A second set of bottles was filled with 828 ml. of water and pressurized to 60 psi with carbon dioxide. These were dropped from a height of 4 feet onto the concrete floor. A small split occurred in the coating which permitted the pressure to be released along with part of the carbonated water, but no glass fragments escaped.

The coatings applied to the bottles according to this invention can be pigmented or dyed in any desirable color available to the art. Pigmentation can be selected for purely aesthetic reasons to match a specific color which might have attained some commercial significance in connection with, e.g., a particular brand of soft drink. It is also possible to pigment the coating with a color required for some protective purpose, e.g., the brown coloration required for beer bottles can be incorporated into the coating.

The coatings may also be surface vulcanized by irradiation or other means to increase the surface bondness and thus improve the scratch resistance without impairing their impact resistance.

To facilitate decoration of the bottles, it is also feasible to treat the coating with an irradiation or corona treatment after application. The irradiation treatment,

TABLE I

SELECTED PHYSICAL PROPERTIES OF FILMS OF POTENTIAL BOTTLE COATING MATERIALS

| Compression Molded Film Material | Tensile at 23° C. 10,000 in./min. | | | Tensile at 0° C. 10,000 in./min. | | |
|---|---|---|---|---|---|---|
| | Strength psi | Elong. % | Energy ft. lb./in.$^2$ | Strength psi | Elong. % | Energy ft. lb./in.$^2$ |
| Ethylene-sodium acrylate copolymer[1] | 3200 | 130 | 350 | 5200 | 57 | 200 |
| Polypropylene[2] | 7300 | 4 | 20 | — | — | — |
| Polypropylene-polyisobutylene[3] 2/1 blend | 3500 | 400 | 850 | 6300 | 61 | 183 |
| Polypropylene-hydrocarbon copolymer[4] 2/1 blend | 3600 | 330 | 680 | 5800 | 72 | 210 |

[1] Surlyn® AD-5001 ionomer (E.I. du Pont de Nemours & Co.), melt flow index 20 dg./min. at 190° C., melt temperature 204° F., Vicat softening temperature 160° F.
[2] Profax® 7501 polypropylene (Hercules Incorporated), melt flow index 4 dg./min. at 230° C., melt temperature 330° F., 8% ethylene
[3] Vistanex L-120 polyisobutylene (Exxon Chemical Company), Staudinger M.W. 99,000-117,000
[4] Nordel 1500 ethylene-propylene copolymer rubber (E.I. du Pont de Nemours & Co.)

The thickness of the coating is determined by the application to which the container is intended to be put. The most demanding use is the soft drink or beer type bottle whose contents are under pressure of up to about 60 psi. For this application, a thickness of about 3 to 10 mils is needed. For applications in which the contents are not under pressure, thinner coatings can be employed, i.e., about 2 to 6 mils.

In order to demonstrate the invention, 32-ounce screw cap soft drink bottles were dip coated in an 8 % by weight solution of ethylene-polypropylene crystalline copolymer containing 8% ethylene (I.V. 2.3) and polyisobutylene rubber (Vistanex L-80, Exxon Chemical Co.) in a high bonding aliphatic hydrocarbon solas is known in the prior art, imparts adhesive qualities to the polymer surface whereby a label can be affixed to the bottle and also permits the surface to be printed with appropriate identifying legends.

It is also possible to apply a label to the glass and apply the coating over the label. Such a label can be, e.g., a paper label adhered to the glass or a design applied by silk screen or other printing techniques. The label must be such that it does not adhere strongly to both the plastic coating and the bottle.

What I claim and desire to protect by Letters Patent is:

1. A glass container having as a surface coating an alloy consisting essentially of an elastomeric blend of propylene polymer having an intrinsic viscosity of about 2.2 to 3.0 and 15 to 40% by weight based on the weight of the total blend of a hydrocarbon elastomer selected from the class consisting of
   (a) polyisobutylene rubber; and
   (b) ethylene-propylene copolymer rubbers; said blend having a good high rate elongation and energy absorption characteristics at room temperature.

2. A glass container of claim 1 wherein the hydrocarbon elastomer is polyisobutylene rubber.

3. A glass container according to claim 1 which is a soft drink bottle capable of being pressurized to at least about 60 psi.

4. The container as in claim 1 in which the propylene polymer is a copolymer containing about 5 to 10% ethylene by weight.

5. The container of claim 2 wherein the propylene polymer is an ethylene-propylene copolymer having an intrinsic viscosity of about 2.2 to 3.0 and an ethylene content of about 5 to 10% by weight and the coating is about 3 to 10 mils in thickness.